United States Patent
Stein

(10) Patent No.: US 6,251,265 B1
(45) Date of Patent: Jun. 26, 2001

(54) PRESSURE REGULATING SLUDGE FILTER

(76) Inventor: Myron Stein, 31412 Flying Cloud, Leguna Niguel, CA (US) 92677

( * ) Notice: Subject to any disclaimer, the term of this patent is extended or adjusted under 35 U.S.C. 154(b) by 0 days.

(21) Appl. No.: 09/292,525

(22) Filed: Apr. 15, 1999

(51) Int. Cl.[7] .................................................. B01D 35/02
(52) U.S. Cl. ........................ 210/117; 165/119; 210/137; 210/429; 210/448; 210/450
(58) Field of Search .............................. 165/119; 210/87, 210/117, 136, 137, 429, 431, 435, 437, 446, 448, 450, 167

(56) References Cited

U.S. PATENT DOCUMENTS

| | | | |
|---|---|---|---|
| 2,793,752 | * | 5/1957 | Jay ........................................ 210/448 |
| 3,773,107 | * | 11/1973 | Benner ................................... 165/119 |
| 4,018,686 | * | 4/1977 | Schufflebarger et al. ............ 210/448 |
| 4,082,665 | * | 4/1978 | Schneider et al. ..................... 210/91 |
| 4,166,792 | * | 9/1979 | Offer et al. ............................ 210/131 |
| 4,197,207 | * | 4/1980 | Rosaen et al. ........................ 210/447 |
| 4,477,352 | * | 10/1984 | Pappas .................................. 210/448 |
| 4,697,617 | * | 10/1987 | Bourke et al. ........................ 137/549 |
| 4,743,365 | * | 5/1988 | Noland .................................. 210/106 |
| 5,181,534 | * | 1/1993 | Hashida et al. ....................... 137/501 |
| 5,662,791 | * | 9/1997 | Hurst et al. ............................. 210/94 |

* cited by examiner

*Primary Examiner*—Peter A. Hruskocki
(74) *Attorney, Agent, or Firm*—Womble Carlyle Sandridge & Rice

(57) ABSTRACT

A combination coolant filter and pressure regulator for an automotive engine's cooling system is configured to be spliced in line with the coolant supply line to the heater core. The filter has a housing and a filter element that is moveable within the housing between a first position opening up communication through the housing and a second position restricting communication through the housing. A spring biases the filter element toward its first position. Normal coolant flow through the housing passes through the filter for removal of entrained contaminants. Under conditions of high coolant flow and thus high pressures, the filter element moves against the bias of the spring toward its second position restricting coolant flow and protecting the heater core from damage due to coolant overpressure.

6 Claims, 2 Drawing Sheets

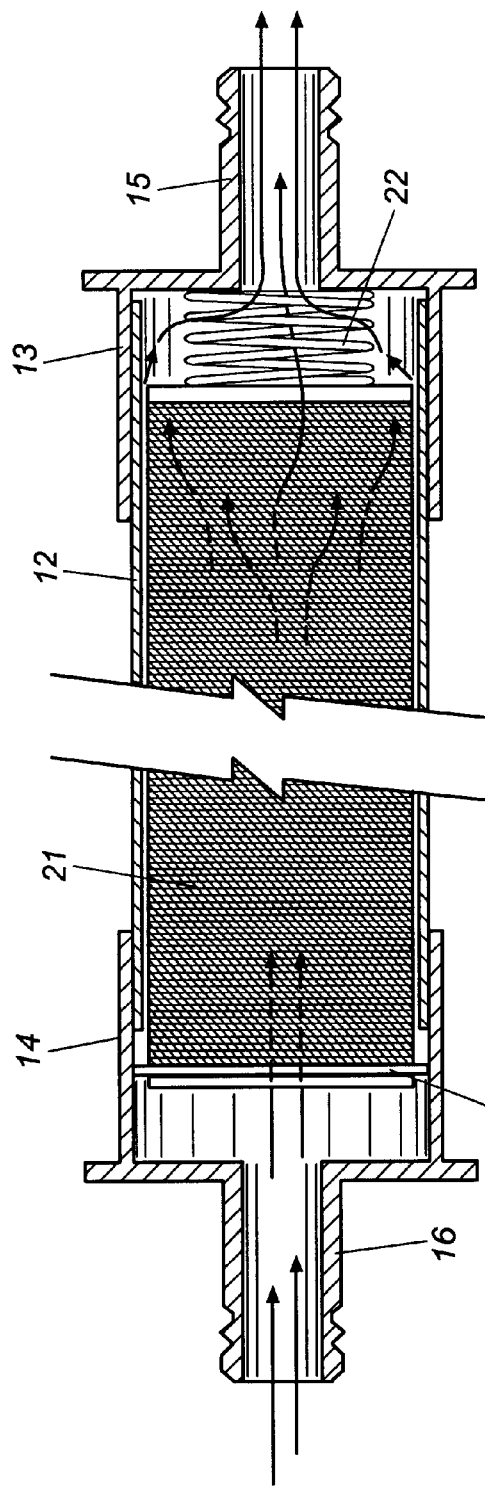
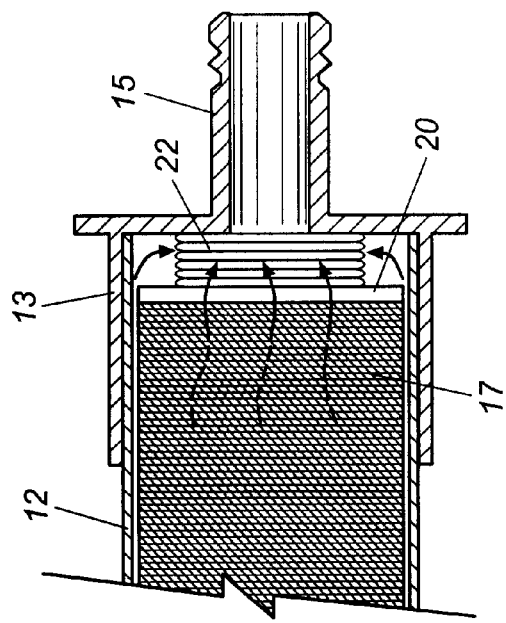

PRESSURE REGULATING SLUDGE FILTER

TECHNICAL FIELD

The present invention relates generally to automobile engines and more particularly to the filtering of coolant circulating through automobile engines to remove casting sand, rust particles, and other sludge entrained within the coolant flow. The invention further relates to regulating coolant pressure to the heater coils of an automobile during rapid acceleration to prevent heater coil blowout.

BACKGROUND OF THE INVENTION

Water cooled cast iron or cast aluminum engines are used throughout the automotive industry to power modern cars and trucks. During fabrication, the engine blocks of such engines are formed by pouring molten metal into a mold formed in casting sand. When the molten metal cools and solidifies to form the metal block, the casting sand is removed from around and through the block, which is further machined to form the finished part. The process of removing the casting sand, particularly from inside the engine coolant passageways of a cast engine block, is not trivial. Typically, the blocks are tumbled to dislodge the casting sand and their coolant passageways are thoroughly flushed with a cleaning solution.

While the cleaning and flushing process cleans most of the casting sand from the coolant passageways of an engine block, there nevertheless remains a small amount of sand that is not removed because it is trapped in crevices or partially imbedded in the walls of the passageways. This sand becomes a problem during normal operation of a vehicle in which the engine block is installed because the grains of casting sand are slowly dislodged by the circulating engine coolant and entrained in the flow of coolant through the water pump and coolant passageways of the engine. The abrasive effect of this sand tends to erode rotors and seals within the water pump and can collect at certain locations within the coolant passageways creating partial blockages and "hot spots" that can eventually destroy an engine. In addition to casting sand, other contaminates such as rust flakes and calcified minerals can become entrained in the coolant flow over time.

Another common problem related to vehicle coolant systems is the rupturing or blowout of a vehicle's heater core as a result of unusually high coolant pressures. Such pressures typically occur during extreme acceleration or other high engine revolution when the water pump is operating at high speeds. While the problem is more common in high performance high revolution engines, it nevertheless can also occur in common passenger vehicles. A heater core blowout is particularly expensive to repair because the heating system of the vehicle must be disassembled, which usually entails disassembly of the dash and other major components of the vehicle. In addition, a go heater core blowout can quickly drain a vehicle of its coolant, resulting in overheating and ruination of the vehicle's engine.

Some attempts to filter or remove casting sand and other sludge entrained within a vehicle's coolant flow have been made. For example, U.S. Pat. No. 3,773,107 of Bener discloses a sump trap located at the inlet of a vehicle's radiator to collect entrained sludge. U.S. Pat. No. 5,662,791 of Hurst et al. discloses an in-line filter connected in the return hose of the cooling system to filter entrained sludge particles from the flow. Other general purpose filters and valves are illustrated in U.S. Pat. No. 4,166,792 of Offer et al., U.S. Pat. No. 4,183,812 of Rosaen et al., U.S. Pat. No. 4,697,617 of Bourke et al., U.S. Pat. No. 4,743,365 of Noland, and U.S. Pat. No. 5,181,534 of Hashida et al. While the devices disclosed in these patents can be effective in removing or filtering entrained sludge particles from engine coolant, none of them addresses the problems caused by heater core overpressure. Furthermore, applicant is aware of no device that simultaneously removes entrained sediments from the coolant and provides pressure regulation for a heater coil under conditions of extreme coolant pressure to prevent heater core blowout.

Accordingly, there exists a need for an effective and efficient method and apparatus for removing entrained casting sand and sludge from the coolant flow within a vehicle engine while at the same time automatically regulating coolant pressure to the coils of a vehicle's heater core. It is to the provision of such a method and apparatus that the present invention is primarily directed.

SUMMARY OF THE INVENTION

Briefly described, the present invention, in one preferred embodiment thereof, comprises a combination sludge filter and pressure regulator valve or filter valve for an automotive coolant system. The filter valve comprises a cylindrical outer sleeve that carries an elongated cylindrical filter element. The filter element is capped at its upstream end by an upstream filter cap provided with a central opening communicating with the interior of the filter element and is closed at its downstream end by a downstream filter cap. The cylindrical hollow body of the filter element between the filter caps is formed by a porous filter medium. With this configuration, coolant entering the opening in the upstream filter cap moves into the interior of the filter element and passes through the filter medium to the outside of the filter element.

The cylindrical outer sleeve of the filter valve is capped at its ends by an upstream and a downstream end cap respectively, which capture the filter element within the outer sleeve. The upstream and downstream end caps are provided with coupling nipples for coupling the filter valve in line with the coolant hose supplying coolant to the heater coils from the water pump. An annular seal is provided around the periphery of the upstream filter cap of the filter element and the seal is sized for sliding movement against the interior surface of the valve body. The downstream filter cap is not sealed but, instead, coolant is free to flow around the downstream filter cap and through the coupling nipple on the downstream end cap of the filter valve. In this way, coolant entering the filter valve through the upstream end cap is confined by the annular seal to enter the interior of the filter element through the opening in the upstream filter cap. Since the downstream filter cap is closed, the coolant is then forced through the filter medium to the outside of the filter element, from where it flows around the downstream filter cap and through the coupling nipple of the downstream end cap of the filter valve. Thus, the invention provides an in line filter for removing casting sand and other sludge entrained in the coolant flow to the heater coils.

The filter element is shorter than the cylindrical outer sleeve of the filter valve. A coiled compression spring is disposed between the downstream filter cap of the filter element and the downstream end cap of the filter valve. The compression spring yieldably biases the filter element toward the upstream end of the filter valve with a force determined by the spring constant. Under normal coolant flow pressures, the compression spring is not compressed or is compressed only slightly by the force of coolant on the filter element and coolant flows freely through the filter valve and is filtered as it passes through the filter element. Thus, most of the time, the filter valve functions as an efficient in line coolant filter.

However, when the coolant pressure rises under conditions of extreme acceleration or other high rev condition to levels that could damage the heater core, the increased force on the filter element moves the filter element in a downstream direction against the bias of the compression spring thereby compressing the spring. This, in turn, causes coolant flow through the filter valve to be substantially restricted or shut off for the duration of the high pressure condition. The heater coil is thus protected from damage resulting from coolant pressure surges. When coolant pressure returns to normal, the compression spring urges the filter element back toward the upstream end of the filter valve, thereby restoring normal coolant flow to the heater coils.

Thus it is seen that a simple, efficient, and effective filter valve is now provided that addresses and solves the shortcomings of the prior art and that simultaneously performs the dual functions of filtering entrained contaminants from the coolant of an automotive engine and providing automatic regulation of coolant pressure to the heating coils of a vehicle's heating system. These and other features, objects, and advantages of this invention will become more apparent upon review of the detailed description set forth below taken in conjunction with the accompanying drawing figures, which are briefly described as follows.

BRIEF DESCRIPTION OF THE DRAWINGS

FIG. 2 is a side elevational longitudinally sectioned view of the filter valve of FIG. 1 shown in its assembled and operating configuration.

FIG. 3 is a longitudinal sectioned view of the downstream end portion of the filter valve illustrating compression of the spring and consequent restriction of fluid flow under conditions of high coolant pressures.

DETAILED DESCRIPTION OF THE PREFERRED EMBODIMENTS

Figure 1:
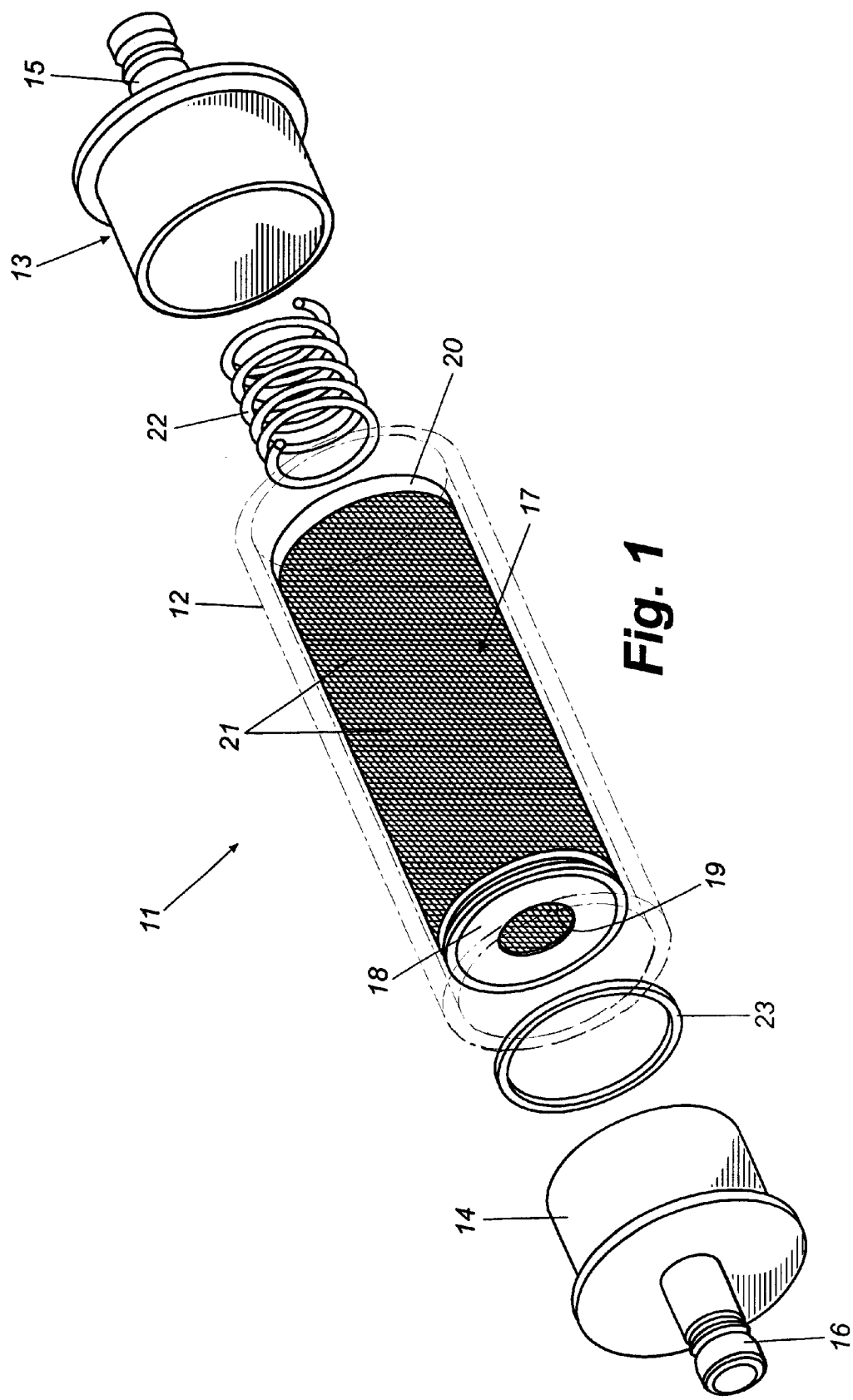
FIG. 1 is a perspective exploded view of the filter valve of this invention illustrating the various components thereof.

Referring now to the drawings, in which like numerals refer to like parts throughout the several views, FIG. 1 is an exploded perspective illustration of a preferred embodiment of the filter valve of the present invention. The filter valve 11 comprises a cylindrical outer sleeve 12, preferably fabricated of plastic and shown in phantom lines in FIG. 1 for clarity. The cylindrical outer sleeve 12 has an open upstream end 13 and an open downstream end 14. An upstream end cap 16 is configured to fit into the upstream end 13 of the outer sleeve and is formed with a cylindrical insert 17 capped by a disc-shaped cover 18 forming a radially projecting peripheral rim 19. The insert 17 has an outer diameter substantially the same as or slightly larger than the inner diameter of the cylindrical sleeve 12 so that the end cap 16 can be pressed into the upstream end 13 of the sleeve 12 until its peripheral rim 19 abuts the end of the sleeve. In this way, the end cap 16 forms and is held in place by a friction fit with the inner wall of the sleeve 12. Ancillary securing means such as pins or adhesive can be applied if desired to enhance the friction fit and assure that the end cap 16 does not become dislodged by coolant pressure during operation. The upstream end cap 16 is provided with an appropriately sized coupling nipple 21 that communicates with the interior of the sleeve through the cover for splicing the filter valve into the coolant supply hose to the heater coils of a vehicle.

Similarly, a downstream end cap 22 is provided for closing the downstream end of the filter valve 11. In the preferred embodiment, the downstream end cap 22 is identical to the upstream end cap 16 and is formed with a cylindrical insert 23, a disc-shaped cover 24 forming a peripheral rim 26, and a coupling nipple 27 for splicing the filter valve in a coolant supply line. While one of the end caps 16 and 22 can be permanently secured to a respective end of the sleeve 12, at least one should be selectively removable and replaceable to provide access to the interior of the filter valve for replacing the filter element when necessary.

A generally cylindrical filter element 31 is disposed within the outer sleeve 12, as best illustrated in FIG. 2. The filter element 31 has a hollow main body 35 formed of an appropriate porous filter medium such as, for example, fine screen or filter paper. The main body 35 is capped at its upstream end by an upstream filter cap 32 having a central opening 33 formed therethrough. The filter cap 32 is formed with an annular rim 34, which, in turn, is provided with a circumferentially extending annular groove 36.

An annular rubberized seal 37 is sized to fit in the groove 36 (FIG. 2) and has an outer diameter that is the same as or slightly smaller than the inner diameter of the cylindrical insert 17 on the upstream end of the filter valve. The seal 37 preferably is formed of a rubberized material and is sized to form a substantial seal with the inner surface of the end cap 16 but nevertheless to be longitudinally slidable along the inner surface to allow for longitudinal movement of the filter element 31 within the filter valve, as described in more detail below.

The downstream end of the filter element is capped by a closed filter cap 38 having an outer diameter less than the inner diameter of the downstream end cap 24 to allow for fluid flow around the periphery of the filter cap and out through the coupling nipple 27 of the downstream end cap 22.

A compression spring 39 is disposed in the filter valve between the downstream filter cap 38 and the downstream end cap 22. The compression spring 39 biases the filter element 31 toward the upstream end of the filter valve with a force that is determined by the spring constant of the compression spring. While a compression spring is illustrated in the drawings as the preferred biasing means it will be understood by those of skill in the art that other appropriate biasing means such as, for example, a leaf spring could be substituted for the illustrated compression spring with comparable results.

FIG. 2 shows the filter valve of this invention as it appears during operation and under conditions normal or nominal coolant flow to the heater coils. While the coolant supply hose is not shown in the figures for the sake of clarity, it will be understood that the filter valve is spiced in line with the coolant supply hose with the coupling nipple 21 on the upstream end of the filter valve receiving coolant from the vehicle's water pump and the coupling valve 27 on the downstream end of the filter valve delivering filtered coolant to the heater coil of the vehicle. Coolant inflow is indicated by arrows 41 in FIG. 2 while coolant outflow is indicated by arrows 42. Coolant flow through the filter element itself is illustrated by arrows 43.

Coolant flow 41 is supplied from the vehicle's water pump through the coupling nipple 21. As the flow enters the upstream end of the filter valve, it cannot pass around the outside of the filter cap 32 because this path is sealed by the annular seal 37. Thus, the coolant is constrained to enter the interior of the filter element 31 through the opening 33 formed in the upstream filter cap 32. From inside the filter element 31, the coolant flows through the filter medium 35 and into the space between the filter element and the inner wall of the cylindrical sleeve 12 as indicated by arrows 43. The coolant is forced through the filter medium because the downstream end of the filter element is closed off by the downstream filter cap 38. As the coolant passes through the filter medium, entrained contaminants such as, for example, casting sand residue, rust chips, sludge, and the like are filtered out and remain trapped within the filter element.

From the space between the filter element and the cylindrical sleeve, the coolant flows around the downstream filter cap 38 and out the coupling nipple, as illustrated by arrows 42, to be delivered through the attached heater hose to the heater coil of the vehicle's heating system. Thus, under normal coolant flow conditions, the filter valve of this inventions functions as an efficient in line coolant filter.

The pressure of the coolant within the filter element causes a proportional net force to be exerted on the filter element in the downstream direction. This force, in turn, bears against the compression spring 39, which opposes the force. The spring constant of the compression spring is selected such that the force generated by coolant pressures under normal operation of the engine compresses the spring 39 only slightly, as illustrated in FIG. 2. Under these conditions, the invention functions as a filter as described above. However, as illustrated in FIG. 3, when coolant pressure increases to dangerous levels under, for example, extreme acceleration or high rev conditions, the compression spring 39 is completely or substantially completely compressed by the resulting force. The compressed spring 39 and the proximity of the filter cap 38 to the end cap 22 forms a barrier that functions to restrict the flow of coolant around the downstream filter cap as indicated by arrows 44. Coolant flow is therefore shut off or significantly restricted for so long as the coolant pressure remains critically high. When coolant pressure returns to a normal operating level, the compression spring again urges the filter element toward the upstream end of the filter valve so that coolant flow and filtering can resume.

Thus, the filter valve of this invention simultaneously functions as a coolant filter and as a check valve or regulator valve to prevent heater core damage as a result of extreme coolant pressures. Further, as the filter element becomes clogged over time, force resulting from fluid flow through the filter medium increases and gradually restricts the flow of coolant to the heater coils. This manifests itself in noticeably reduced heating capacity within the passenger compartment. Accordingly, reduced heating capacity serves as an automatic signal to the vehicle owner or a mechanic that the filter element within the filter valve needs replacing.

The invention has been described herein in terms of preferred embodiments and methodologies. However, various changes to the illustrated and described embodiments might well be implemented by those of skill in the art within the scope of the invention. For example, the filter valve has been illustrated as being cylindrical in shape. It might just as well be another shape such as, for example, square or hexagonal, although cylindrical is believed to be most efficient. Biasing means other than a compression spring might also be used and the end caps need not fit into the outer sleeve but could just as well fit on the outside of the sleeve or be threaded to the sleeve. Finally, plastic has been described as the preferred material from which to fabricate the filter valve and represents the best mode known to the inventor of carrying out the invention. However, other materials such as aluminum might be substituted according to the needs of a particular application. plastic construction therefore should not be considered a limitation of the invention. These and other additions, deletions, and modifications might well be made by those of skill in the art without departing from the spirit and scope of the invention as set forth in the claims.

What is claimed is:

1. A filter valve for filtering a coolant and controlling coolant flow volume, said filter valve comprising a hollow body having ends, couplers on said ends for coupling said hollow body in line with a coolant supply hose for flow of coolant through said hollow body, a filter element disposed in said hollow body for filtering coolant flowing through said hollow body, filter element having a substantially open end and a substantially closed end and being moveable within said hollow body in response to coolant flow through said filter element between a first position opening up communication through said hollow body and a second position restricting commutation through said hollow body, a biasing spring in said hollow body between and end of said hollow body and said substantially closed end of said filter element for yieldably biasing said filter element toward said first position and permitting said filter element to move toward said second position in response to coolant flow volume through said filter element above a predetermined threshold, and a seal at said substantially open end of said filter element for sealing against migration of coolant around said filter element.

2. A filter valve as claimed in claim 1 and wherein said biasing spring comprises a coil compression spring disposed between an end of said filter element and an end of said hollow body.

3. A filter valve as claimed in claim 1 and wherein said hollow body and said filter element are substantially cylindrical.

4. A filter valve as claimed in claim 3 and wherein said filter element is shorter than said hollow body and is longitudinally movable within said hollow body between said first and said second positions.

5. A filter valve for filtering a coolant and controlling coolant flow volume, said filter valve comprising a hollow body having an upstream end and a downstream end, couplers on said ends of said hollow body for coupling said hollow body in line with a coolant supply hose for flow of coolant through said hollow body, a filter element in said hollow body, said filter element having a substantially open end adjacent said upstream end of said hollow body and a substantially closed opposite end adjacent said downstream end of said hollow body, said filter element being movable within said hollow body toward and away from said upstream end thereof, a biasing spring for yieldably biasing said filter element toward said upstream end of said hollow body, and a seal at said substantially open end of said filter element for sealing against migration of coolant around said filter element, said opposite end of said filter element approaching and restricting fluid flow through said downstream end of said hollow body as said filter element moves against said biasing spring away from said upstream end thereof in response to fluid flow volume above a predetermined threshold.

6. A filter valve as claimed in claim 5 and wherein said biasing spring is disposed between said substantially closed end of said filter element and said downstream end of said hollow body.

* * * * *